(12) United States Patent
Maine, Jr. et al.

(10) Patent No.: US 10,287,098 B2
(45) Date of Patent: May 14, 2019

(54) MODULAR EYE LINK CONVEYOR BELT

(71) Applicant: CAMBRIDGE INTERNATIONAL, INC., Cambridge, MD (US)

(72) Inventors: Robert E. Maine, Jr., Salisbury, MD (US); George H. Messick, Jr., Cambridge, MD (US); Thomas O. Perdue, Salisbury, MD (US); Jeffrey D. Ulchak, Salisbury, MD (US)

(73) Assignee: CAMBRIDGE INTERNATIONAL, INC., Cambridge, MD (US)

( * ) Notice: Subject to any disclaimer, the term of this patent is extended or adjusted under 35 U.S.C. 154(b) by 0 days.

(21) Appl. No.: 15/347,265

(22) Filed: Nov. 9, 2016

(65) Prior Publication Data
US 2017/0129708 A1    May 11, 2017

Related U.S. Application Data

(60) Provisional application No. 62/253,300, filed on Nov. 10, 2015.

(51) Int. Cl.
| | |
|---|---|
| *B65G 15/48* | (2006.01) |
| *B65G 15/54* | (2006.01) |
| *B65G 17/08* | (2006.01) |

(52) U.S. Cl.
CPC .......... *B65G 17/083* (2013.01); *B65G 15/48* (2013.01); *B65G 15/54* (2013.01)

(58) Field of Classification Search
CPC ... B65G 17/061; B65G 17/063; B65G 17/064
USPC ................................................. 198/848, 849
See application file for complete search history.

(56) References Cited

U.S. PATENT DOCUMENTS 5,101,966 A    4/1992   Lapeyre

FOREIGN PATENT DOCUMENTS

| DE | 16 02 634 A1 | 3/1970 | |
|---|---|---|---|
| FR | 1 597 154 A | 6/1970 | |
| FR | 2 815 330 A1 | 4/2002 | |
| NL | 1 005 979 C2 | 11/1998 | |
| WO | WO-0232791 A1 * | 4/2002 | ........... B65G 17/062 |

OTHER PUBLICATIONS

Extended European Search Report dated Mar. 30, 2017 in counterpart European Application No. 16198095.8 (8 pages, in English).

* cited by examiner

*Primary Examiner* — Gene O Crawford
*Assistant Examiner* — Lester III Rushin
(74) *Attorney, Agent, or Firm* — Buchanan Ingersoll & Rooney PC

(57) ABSTRACT

A modular eye link conveyor belt and method of assembling a modular eye link conveyor belt includes (a) welding a plurality of eyelets and bar links to a cross wire having a predetermined module width to form at least one first module row; (b) welding a plurality of eyelets and bar links to a cross wire having a predetermined module width to form at least one second module row; connecting the first module row and the second module row with a cross rod extending through the plurality of eyelets and thereby forming a first module; repeating steps (a) and (b) and forming a second module; and connecting the first module and the second module with a cross rod extending through the plurality of eyelets.

8 Claims, 5 Drawing Sheets

MODULAR EYE LINK CONVEYOR BELT

TECHNICAL FIELD

The disclosure herein is directed to a conveyor belt, in particular an eye link style conveyor belt, and more particularly to a modular eye link style conveyor belt.

BACKGROUND

Eye link style conveyor belts have been in existence for some time and are a popular style of belting in Europe. Referring to FIGS. 1A and 1B, the eye link conveyor belt 10, 10' is constructed of small eyelets 12, which may be welded onto a cross wire 13 to form segments 14 (FIG. 1B) generally 4-12 inches in width, which are then cut-down as needed and brick-laid assembled with other components such as reinforcing/support bars 18 (bar links) to form a row of segments and components which are then linked to adjacent rows with hinge point connecting rods 16 (cross rods). The segments/components can be varied in pitch as well as in wire diameter.

These belts have the advantage of an extremely stable top surface and they are durable. They are very open, cleanable and drainable which are good for airflow and food processing. They also have excellent transfer characteristics for top heavy or delicate products. This makes them useful in pasteurizing, drying, frying, cooling, freezing and baking.

Heretofore, the major disadvantages of eye link style belts have been that the belt is constructed of a plurality of segments 14 and components such as reinforcing/support bars 18 that not only make the belt very expensive and time consuming to assemble but also make it more difficult to splice and maintain the conveyor belt in the field. This disadvantage increases dramatically as belt width increases. It also becomes extremely expensive and problematic to vary the surface characteristics of the conveyor belt without adding extreme levels of complexity and cost as well.

Accordingly, there exists a need in the marketplace for an eye link conveyor belt that has the advantages of the prior art but eliminates the costs and complexity for assembly, splicing and maintenance while allowing varying surface/engineering characteristics.

SUMMARY

The disclosure herein provides a method of assembling a modular eye link conveyor belt comprising (a) welding a plurality of eyelets and bar links to a cross wire having a predetermined module width to form at least one first module row; (b) welding a plurality of eyelets and bar links to a cross wire having a predetermined module width to form at least one second module row; connecting the first module row and the second module row with a cross rod extending through the plurality of eyelets and thereby forming a first module; repeating steps (a) and (b) and forming a second module; and connecting the first module and the second module with a cross rod extending through the plurality of eyelets.

A further aspect of the disclosure is directed to a modular eye link conveyor belt comprising a plurality of eyelets positioned at a predetermined spacing along a cross wire; a plurality of bar links positioned on the cross wire; a plurality of cross rods interconnecting said plurality of eyelets; wherein said bar links each include a v-shaped groove configured to receive the cross wire thereacross.

BRIEF DESCRIPTION OF THE DRAWING FIGURES

These and other features and advantages of the disclosure will become more readily apparent to those skilled in the art upon reading the following detailed description, in conjunction with the appended drawings in which.

DETAILED DESCRIPTION OF THE PREFERRED EMBODIMENTS

Figure 1A:
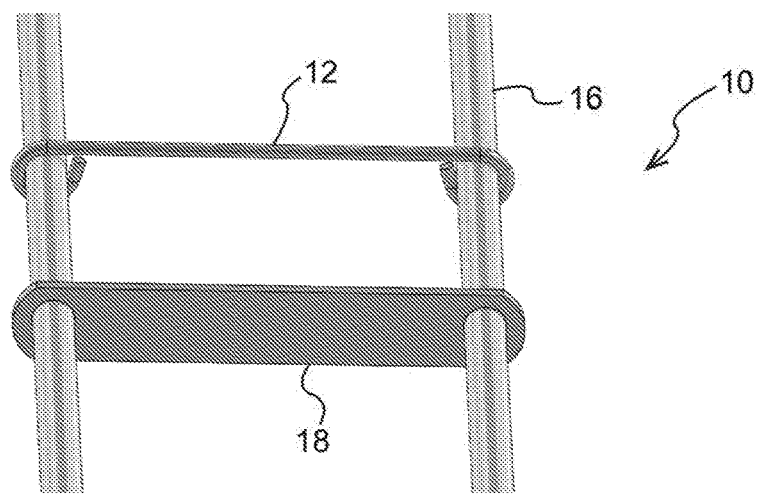
FIG. 1A is a perspective view of a portion of an eye-link style conveyor belt as known in the art.
Figure 1B:
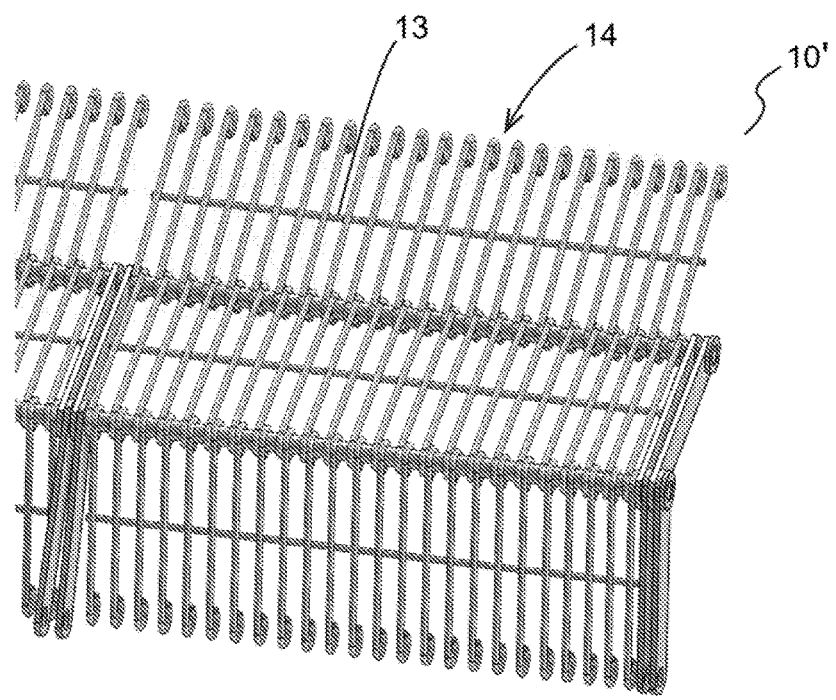
FIG. 1B is a plan view of an eye-link style conveyor belt as known in the art.
Figure 2:
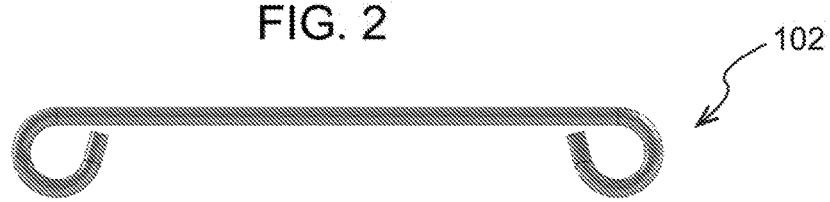
FIG. 2 is a schematic view of an eyelet according to an exemplary embodiment of the disclosure.
Figure 3:
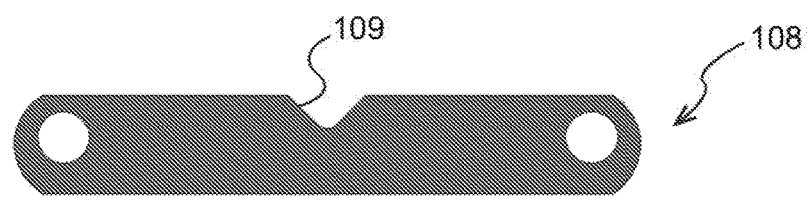
FIG. 3 is a schematic view of a bar link according to an exemplary embodiment of the disclosure.
Figure 4:
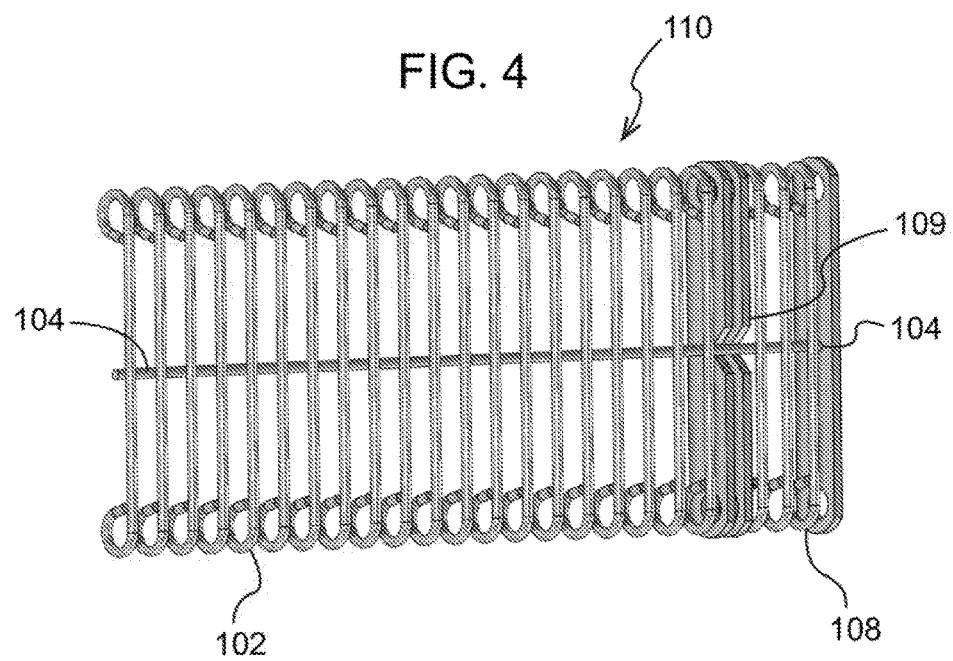
FIG. 4 is perspective view of a segment assembled from the eyelets and bar links according to an exemplary embodiment of the disclosure.

An eye link style conveyor belt in accordance with an exemplary embodiment of the disclosure is shown generally in FIGS. 2-7 by reference numeral 100. Conveyor belt 100 preferably comprises a plurality of eyelets (eye links) 102 which are formed from a metal wire and positioned with a fixed spacing or first count along a cross wire 104 by welding or the like in the width direction of the belt, a portion of which is shown in FIG. 4. One or more bar links 108 may be fixed on at least one end by welding or the like. Bar links 108 provide the tension carrying capacity for the belt 100 and they also prevent excessive cross rod and module 112 deflection. As shown in FIGS. 3 and 4, bar links 108 include a V-shaped notch 109 to allow for clearance of the cross wire 104 to pass therethrough. That is, the notch 109 allows the cross wire 104 to extend the full width of the module 112 (see FIGS. 5 and 6) and be welded therealong. Additional bar links 108 may be added to strengthen the belt since the belt should be supported under the bar links only. The rows of eyelets 102, cross wires 104 and bar links 108 are joined together with cross rods 106 passing through the eyelets 102 to form a module row 112 having a predetermined width.

Figure 5:
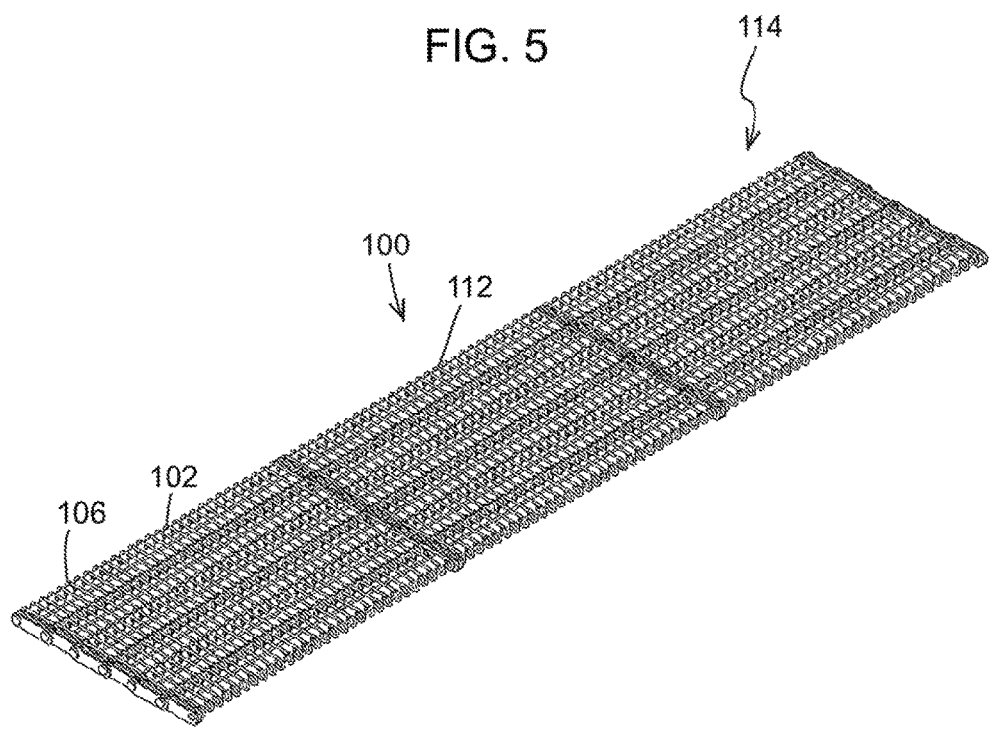
FIG. 5 is a perspective view of a module of an eye link style conveyor belt according to an exemplary embodiment of the disclosure.

In the standard configuration, as shown in FIG. 5, the belt width can be constructed with any number of module rows 112 into a module 114, a plurality of which can then joined to form an integrated conveyor belt 100. This allows for low cost of assembly, maintenance and splicing. The ends of the cross rods 106 may be secured with a welded buttonhead or rivet at the end of the cross rod 106, or similar means, and a washer may also be utilized therewith.

Figure 6:
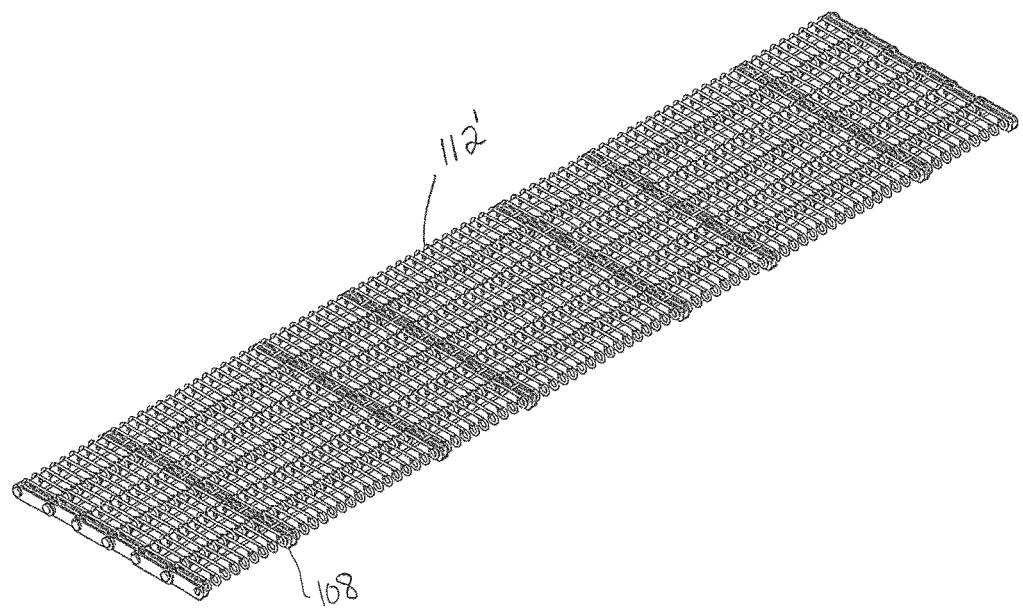
FIG. 6 is a perspective view of a module of an eye link style conveyor belt according to another exemplary embodiment of the disclosure.

Furthermore, in a further exemplary embodiment of the disclosure as shown in FIG. 6, the number of bar links 108 can be varied in their spacing in module row 112' to reinforce certain areas of the belt, such as the areas around sprocket engagement to increase the life and carrying capacity of the belt without adding labor or increasing the difficulty and costs of maintaining the belt.

Figure 7:
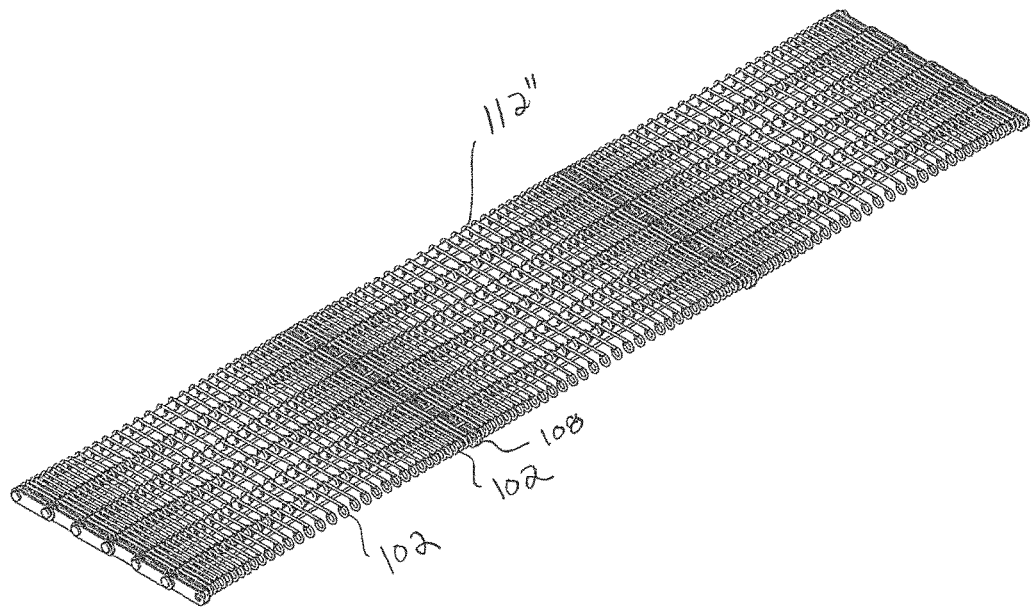
FIG. 7 is a perspective view of a module of an eye link style conveyor belt according to a further exemplary embodiment of the disclosure.

Additionally, the spacing between individual components can be varied to further reinforce the belt around the sprocket areas or the bar links or to vary the open area/air flow in particular sections of belt module row 112". That is, as shown in FIG. 7, the first count spacing between the eyelets 102 around the bar links 108 can be reduced to create a "densification" of the eyelets 102 in these areas, whereas the spacing in the central areas between the bar links 108 is greater. Again this can be done without adding costs or complexity to the end user for maintenance or splicing.

In the above embodiments, varying the spacing and type of major components welded into a full width module results in a belt with customized airflow, open area and tension carrying ability. A further advantage of the disclosure provides the ability to vary the spacing of the cross rods (connecting rods) 106 along the length of the conveyor belt. That is, the second count of the conveyor belt can also be varied because the belt is formed by joining of the welded modules.

The conveyor belt 100 is positively driven preferably with sprockets across the width of the belt. For wider belts, the use of tube drums or varieties of this principle are preferred based on the maximum allowable deflection of the drum. For freezing environments a special self-cleaning sprocket is available to prevent ice buildup. A cage drum is typically used for wide belts in a freezing environment such that a large ice buildup is avoided.

While the present invention has been described with respect to exemplary embodiments of the disclosure, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

The invention claimed is:

1. A method of assembling a modular eye link conveyor belt comprising:
   providing a plurality of eyelets;
   providing a plurality of bar links;
   (a) welding the plurality of eyelets and bar links to a cross wire having a predetermined module width to form at least one first module row;
   (b) welding the plurality of eyelets and bar links to a cross wire having a predetermined module width to form at least one second module row;
   thereafter connecting the first module row and the second module row with a cross rod extending through the plurality of eyelets and thereby forming a first module;
   repeating steps (a) and (b) and forming a second module, varying a spacing between the plurality of eyelets in the first module row and the second module row such that certain areas of the belt are reinforced; and
   connecting the first module and the second module with a cross rod extending through the plurality of eyelets to form the modular eye link conveyor belt.

2. The method of assembling a modular eye link conveyor belt according to claim 1, wherein the step of providing a plurality of bar links includes providing a plurality of bar links which each include a v-shaped notch configured to receive the cross wire.

3. The method of assembling a modular eye link conveyor belt according to claim 1, further comprising varying a spacing of the plurality of bar links in the first module row and the second module row such that certain areas of the belt are reinforced.

4. A modular eye link conveyor belt comprising:
   a plurality of eyelets positioned at a predetermined spacing along a cross wire extending across a width of the conveyor belt;
   a plurality of bar links positioned on the cross wire;
   a plurality of cross rods interconnecting said plurality of eyelets;
   wherein said bar links each include a v-shaped groove configured to receive the cross wire thereacross;
   wherein said plurality of eyelets, bar links and cross rods are welded together to form at least a first module and at least a second module, the first and second modules being joined together to form the conveyor belt of a predetermined length,
   wherein a spacing of the plurality of bar links in the first module and the second module is varied such that certain areas of the belt are reinforced, and
   wherein a spacing between the plurality of eyelets is varied in the first module and the second module such that certain areas of the belt are reinforced.

5. A modular eye link conveyor belt comprising:
   a plurality of eyelets positioned at a predetermined spacing along a cross wire extending across a width of the conveyor belt;
   a plurality of bar links positioned on the cross wire;
   a plurality of cross rods interconnecting said plurality of eyelets;
   wherein said bar links each include a v-shaped groove configured to receive the cross wire thereacross;
   wherein said plurality of eyelets, bar links and cross rods are welded together to form at least a first module and at least a second module, the first and second modules being joined together to form the conveyor belt of a predetermined length, and
   wherein a spacing between the plurality of eyelets is varied in the first module and the second module such that certain areas of the belt are reinforced.

6. The method of assembling a modular eye link conveyor belt according to claim 2, wherein the v-shaped notch includes a narrower, innermost notch portion, and a wider, outermost notch portion, and the cross wire and the v-shaped notch are dimensioned and configured such that only a single cross wire fits in the innermost notch portion.

7. The modular eye link conveyor belt according to claim 4, wherein the v-shaped groove is configured to receive only a single said cross wire thereacross.

8. The modular eye link conveyor belt according to claim 7, wherein the v-shaped groove includes a narrower, innermost groove portion, and a wider, outermost groove portion, and the cross wire and the v-shaped groove are dimensioned and configured such that only said single cross wire fits in the innermost groove portion.

* * * * *